(12) United States Patent
Nourian et al.

(10) Patent No.: US 11,645,581 B2
(45) Date of Patent: May 9, 2023

(54) MEANINGFULLY EXPLAINING BLACK-BOX MACHINE LEARNING MODELS

(71) Applicant: FAIR ISAAC CORPORATION, Roseville, MN (US)

(72) Inventors: Arash Nourian, Alamo, CA (US); Longfei Fan, Los Altos, CA (US); Feier Lian, San Jose, CA (US); Kevin Griest, Sausalito, CA (US); Jari Koister, Menlo Park, CA (US); Andrew Flint, El Cerrito, CA (US)

(73) Assignee: Fair Isaac Corporation, Roseville, MN (US)

(*) Notice: Subject to any disclaimer, the term of this patent is extended or adjusted under 35 U.S.C. 154(b) by 427 days.

(21) Appl. No.: 16/785,468

(22) Filed: Feb. 7, 2020

(65) Prior Publication Data

US 2021/0049503 A1 Feb. 18, 2021

Related U.S. Application Data

(60) Provisional application No. 62/886,296, filed on Aug. 13, 2019.

(51) Int. Cl.
| | | |
|---|---|---|
| *G06N 20/00* | (2019.01) | |
| *G06F 16/90* | (2019.01) | |
| *G06N 7/00* | (2006.01) | |
| *G06N 7/02* | (2006.01) | |
| *G06F 11/34* | (2006.01) | |
| *G06F 16/904* | (2019.01) | |

(52) U.S. Cl.
CPC ......... *G06N 20/00* (2019.01); *G06F 11/3466* (2013.01); *G06F 16/904* (2019.01); *G06N 7/005* (2013.01); *G06N 7/023* (2013.01)

(58) Field of Classification Search
CPC ....... G06N 5/02; G06N 20/00; G06F 11/3072
See application file for complete search history.

(56) References Cited

U.S. PATENT DOCUMENTS

| | | | | |
|---|---|---|---|---|
| 2005/0234697 | A1* | 10/2005 | Pinto | G06Q 30/0254 703/22 |
| 2018/0341851 | A1* | 11/2018 | Chung | G06N 3/082 |
| 2019/0019106 | A1* | 1/2019 | Driscoll | G06N 20/00 |
| 2019/0197411 | A1* | 6/2019 | Di | G06N 5/02 |
| 2019/0378210 | A1* | 12/2019 | Merrill | G06N 5/02 |
| 2020/0082299 | A1* | 3/2020 | Vasconcelos | G06N 20/00 |
| 2020/0279140 | A1* | 9/2020 | Pai | G06F 11/3072 |

* cited by examiner

*Primary Examiner* — Saba Dagnew
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented machines, systems and methods for providing insights about a machine learning model, the machine learning model trained, during a training phase, to learn patterns to correctly classify input data associated with risk analysis. Analyzing one or more features of the machine learning model, the one or more features being defined based on one or more constraints associated with one or more values and relationships and whether said one or more values and relationships satisfy at least one of the one or more constraints. Displaying one or more visual indicators based on an analysis of the one or more features and training data used to train the machine learning model, the one or more visual indicators providing a summary of the machine learning model's performance or efficacy.

18 Claims, 21 Drawing Sheets

Show: overall description of the whole dataset                                                      FINISHED ▷ ✕ ⊞ ⚙

Dataset info
- Number of variables: 39
- Number of observations: 19301
- Total missing (%): 0.00%
- Total size in memory: 5.7 MiB
- Average record size in memory: 312.0 B

Variables types
- Numeric: 31
- Categorical: 0
- Boolean: 3
- Date: 0
- Text (unique): 0
- Rejected: 5
- Unsupported: 0

Warnings
- Model101_score is highly correlated with Model100_score (p=0.90205) [Rejected]
- Model102_score is highly correlated with Model101_score [Rejected]
- app_DebtToIncomeRatio is highly skewed (γ1=20.995) [Skewed]
- cbDlq_MaxDelqDivByPublicRecordsLast12Months has 1458 / 7.55% zeros [Zeros]
- cbDlq_MonthsSinceMostRecentDelinquency has 436 / 2.26% zeros [Zeros]
- cbDlq_NumberTrades60plusEverDivByDerogPubRec has 11664 / 60.74% zeros [Zeros]
- cbDlq_NumberTrades90plusEverDivByDerogPubRec is highly correlated with cbDlq_NumberTrades60plusEverDivByDerogPubRec (p=0.9682) [Rejected]
- cbFile_NumberofTotalTrades has 295 / 1.53% zeros [Zeros]
- cbFile_NumberofTradesOpeninLast12Months has 4546 / 23.55% zeros [Zeros]
- cbFile_PercentInstallmentTrades has 367 / 1.90% zeros [Zeros]
- cbInq_MonthsSinceMostRecentInqexc17days has 7787 / 40.35% zeros [Zeros]
- cbInq_NumberofInqLast6Months has 7128 / 36.93% zeros [Zeros]
- cbInq_NumberofInqLast6Monthsexc17days is highly correlated with cbInq_NumberofInqLast6Months (p=0.99367) [Rejected]
- cbUtil_NetFractionRevolvingBurden has 1048 / 5.43% zeros [Zeros]
- cbUtil_NumberBankDivByNatlTradeswBal75PercentofHighCredit has 7452 / 35.61% zeros [Zeros]
- cbUtil_NumberRevolvingTradeswithBalance has 498 / 2.58% zeros [Zeros]
- PostInf_weight is highly correlated with postInf_target (p=0.98974) [Rejected]

---

Show: Statistical description of each feature                                                       FINISHED ▷ ✕ ⊞ ⚙

Select one feature to show statistical descriptions.

[ scr_BureauScore ▾ ]

scr_BureauScore
Numeric

- Distinct count: 358
- Unique (%): 1.85%
- Missing (%): 0.00%
- Missing (n): 0
- Infinite (%): 0.00%
- Infinite (n): 0

- Mean: 663.77
- Minimum: -9
- Maximum: 839
- Zeros (%): 0.00%

Toggle details

Statistics | Histogram | Common Values | Extreme Values

Quantile statistics
- Minimum: -9
- 5-th percentile: 518
- Q1: 641
- Median: 690
- Q3: 739
- 95-th percentile: 788
- Maximum: 839
- Range: 848
- Interquartile range: 98

Descriptive statistics
- Standard deviation: 149.44
- Coef of variation: 0.22513
- Kurtosis: 12.96
- Mean: 663.77
- MAD: 81.884
- Skewness: -3.4485
- Sum: 12811509
- Variance: 22332
- Memory size: 150.9 KiB

FIG. 4

```
 Important features:
Feature Rank score
0   appOrigScore     0.493087
1   cbInq5Mos        0.471528
2   cbMosAvg         0.434136
3   cbUtilizn        0.406541
4   appTimeAddress   0.166667
5   appIncome        0.147817
6   dealLoanToVal    0.145833
7   cbPctGood        0.100000
8   cbMosDlq         0.083916
9   cb90Ever         0.078788
10  cbMosInq         0.074176
11  dealPctDown      0.062500
12  cbTimeFileYears  0.055556
13  setid            0.041667
14  _train_test      0.035714
** Can pass desired threshold by correction examples
** To pass desired threshold with least number of changes:
prediction of this sample: 0.8133329749107361
10 norm:3.0
12 norm:0.380793618878832885
-> Decrease appOrigScore
Feature appOrigScore has original value 182.0 an dis changed to 141.99989
-> Decrease appTimeAddress
Feature appTimeAddress has original value 19.0 and is changed to 11.0
-> Increase cbUtilizn
Feature cbUtilizn has original value 0.0 and is changed to 26.5
And there is a notable interaction between appOrigScore and cbUtilizn.
** To pass desired threshold with least Euclidean norm:
prediction of this sample: 0.8133329749107361
10 norm:3.0
12 norm:0.380793618878832885
-> Decrease appOrigScore
Feature appOrigScore has original value 182.0 and is changed to 141.99989
-> Decrease appTimeAddress
Feature appTimeAddress has original value 19.0 and is changed to 11.0
-> Increase cbUtilizn
Feature cbUtilizn has original value 0.0 and is changed to 26.5
And there is a notable interaction between appOrigScore and cbUtilizn.
```

FIG. 17

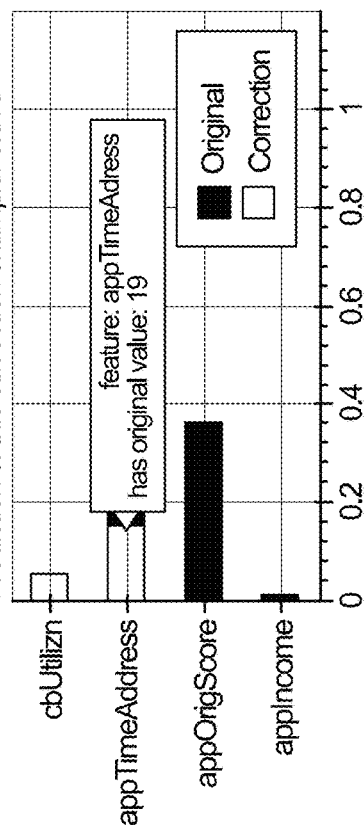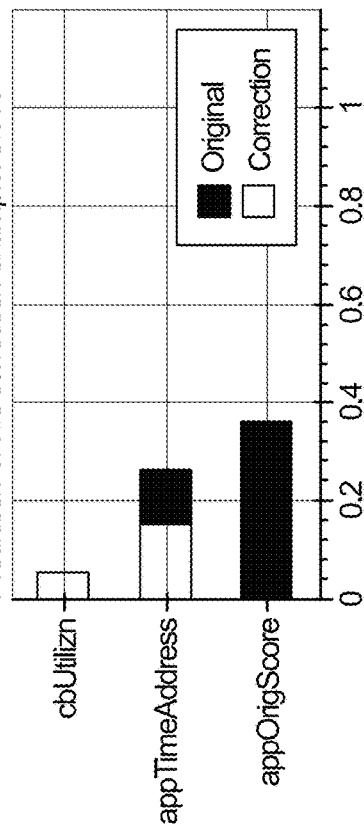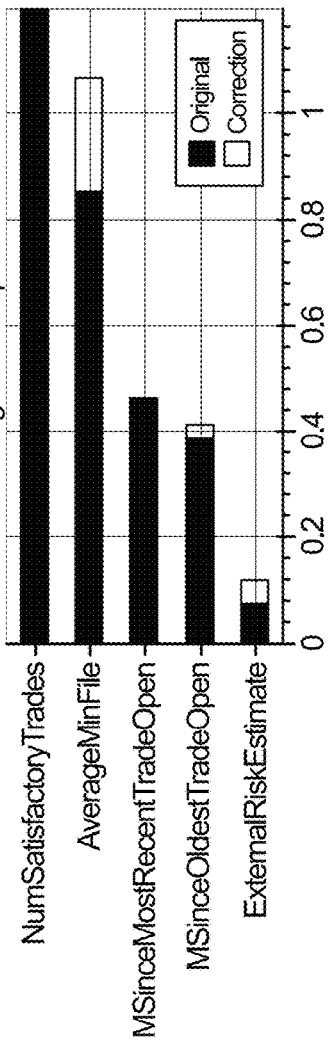
FIG. 18

Here is an example where we are assigning unquie reason codes for special values, positive values, and negative values:

Reason Code -> Reason String:

```
{
  "0": "Lack of tradline information",
  "1": "Lack of usable information",
  "2": "Too many recent inquires",
  "3": "Number of recent inquires",
}
```

Feature -> Reason Code:

```
{
  "NumInqLast6Mo":{
    "special_value": {-9: "0", -8: "1"},
    "negative": "2",
    "positive": "3"
  },
}
```

Select record to explain
Enter decision threshold:
0.5

Select type of record
below threshold

Select record index to explain (0 - 1830)
0

Model's estimated probability: 23.174% (below threshold of 0.5)

```
Top 5 reasons
1 : External Risk Estimate
2 : % trades with balance
3 : Time sence most recent inquiry too low
4 : Number of Installment TL with balance
5 : Length of time accounts have been established too low
```

FIG. 19

MEANINGFULLY EXPLAINING BLACK-BOX MACHINE LEARNING MODELS

CROSS-REFERENCE TO RELATED APPLICATIONS

This application claims priority to and the benefit of the filing date of application Ser. No. 16/263,734 filed on Jan. 31, 2019, and provisional Application Ser. No. 62/886,296, filed Aug. 13, 2019, the entire contents of which are incorporated by references herein in entirety.

TECHNICAL FIELD

The disclosed subject matter generally relates to artificial intelligence technology and, more particularly, to technological improvements that provide insights about the efficacy and understandability of black-box machine learning models in a meaningful manner.

BACKGROUND

Artificial intelligence (AI) refers to introducing human-like logic or intuition in a computing system. AI is commonly used to perform tasks that require intelligence or domain expertise which help solve problems that cannot be defined by a predetermined set of rules or fixed logic. AI systems are thus typically deployed to analyze and classify data and make predictions relying on data and dynamic calculations that are far too voluminous and complex for a human to possibly digest and perform, either mentally or by way of pen and paper.

Machine learning (ML) is a subset of AI that utilizes self-learning algorithms to implement intelligent behavior into AI systems and generally refers to the practice of teaching a computing system to learn, including the ability to dynamically adapt and analyze large volumes of data to identify patterns, without requiring explicit programming. Unconventionally, ML models can provide predictive advantages to enhance the functionality of a system or a computing model when complex relationships or constraints are at play.

Disadvantageously, without a good understanding of the influencers, relationships or constraints that define a ML model, the model's non-routine functionality and behavior may be prone to errors or undesirable results and biases that may not meet certain principles or standards. For example, a lack of complete understanding of a model's behavior may lead to scenarios involving the encoding of unintentional or unwanted features that inappropriately or unknowingly skew the results generated by the model.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented machines, systems and methods are disclosed for providing insights about a machine learning model, the machine learning model trained, during a training phase, to learn patterns to correctly classify input data associated with risk analysis. One or more features of the machine learning model may be analyzed, the one or more features being defined based on one or more constraints associated with one or more values and relationships and whether said one or more values and relationships satisfy at least one of the one or more constraints. One or more visual indicators may be displayed based on an analysis of the one or more features and training data used to train the machine learning model, the one or more visual indicators providing a summary of the machine learning model's performance or efficacy. In response to further analyzing the one or more features and the training data, at least one or more of a global explanation about the machine learning model or a local explanation about the machine learning model may be provided.

The global explanation may provide general information about one or more functionalities of the machine learning model and at least one of a visualization that summarizes the machine learning model's global behavior with respect to the one or more features, or an identification of a first set of features that are influential in generating one or more identifiable outcomes. The further analyzing may be performed based on at least one of a model-dependent approach or a model-independent approach, wherein the model-dependent approach takes into consideration unique properties of the machine learning model, such as the model's structure in calculating a feature's importance to the machine learning's operation for correctly classifying the input data.

The local explanation may provide information with one or more visualizations on predictions performed by the machine learning model in one or more instances. A first instance from the one or more instances may comprise one or more execution slices in which at least one or more of the machine learning model's features, constraints, values or variable correlations are identified and tracked for the purpose of understanding how the machine learning model derives a prediction in the first instance. The local explanation may provide an understanding of how possible changes to an instance's feature values adjust or shift an expected result or projected outcome.

In at least one implementation, a first threshold may be determined and the local explanation provides an understanding of how possible changes to the instance's feature values adjust or shift an expected result or projected outcome beyond the first threshold. In response to understanding how the machine learning model behaves in the first instance, the machine learning model may be tuned to select outcomes that best suit an expected result in a first set of instances. For example, the machine learning model may be tuned to minimally change one or more of the machine learning model's features in a first set of features having a first characteristic. The machine learning model may be tuned by adjusting instances that demand changes to the fewest number of features or instances with a least amount of change to the most important features of the machine learning model.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 3 through 21 are illustrative examples of visual information that may be provided for a better understanding of a model's efficacy and operational integrity, in accordance with one or more embodiments.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
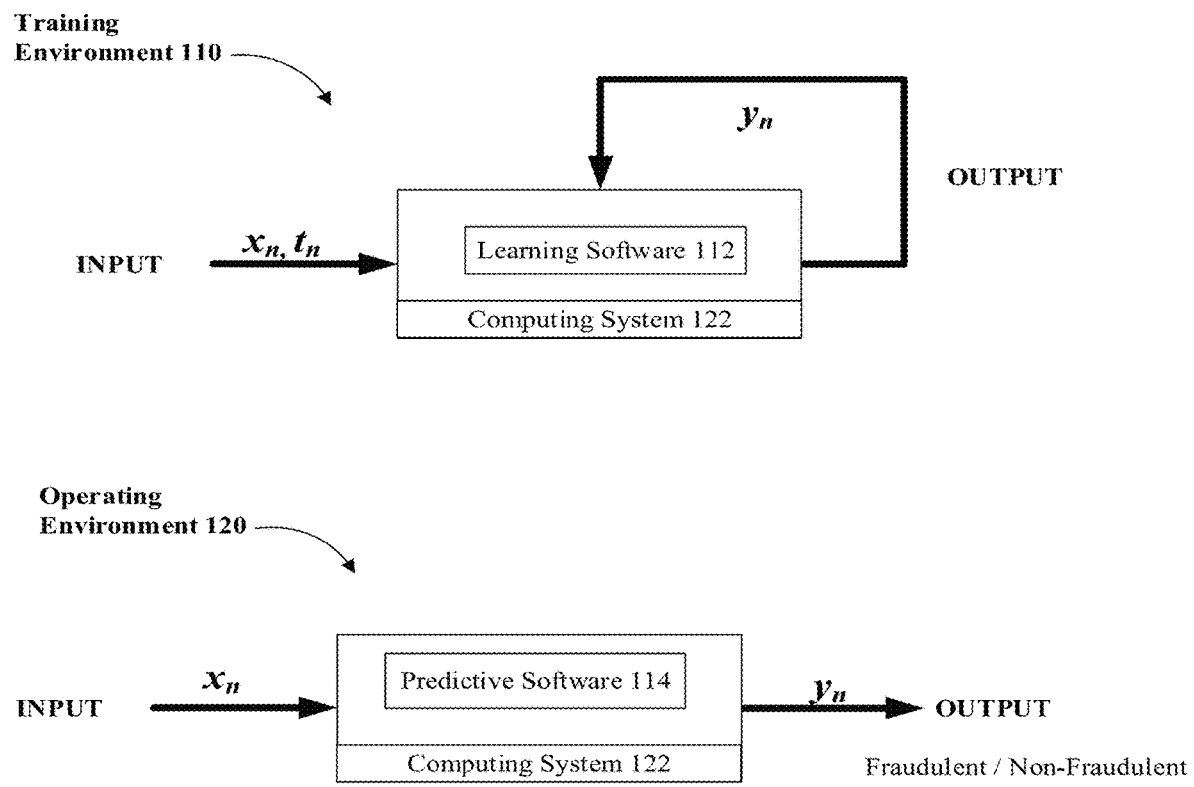
FIG. 1 illustrates example training and operating environments for a ML model, in accordance with one or more embodiments.
Figure 2A:
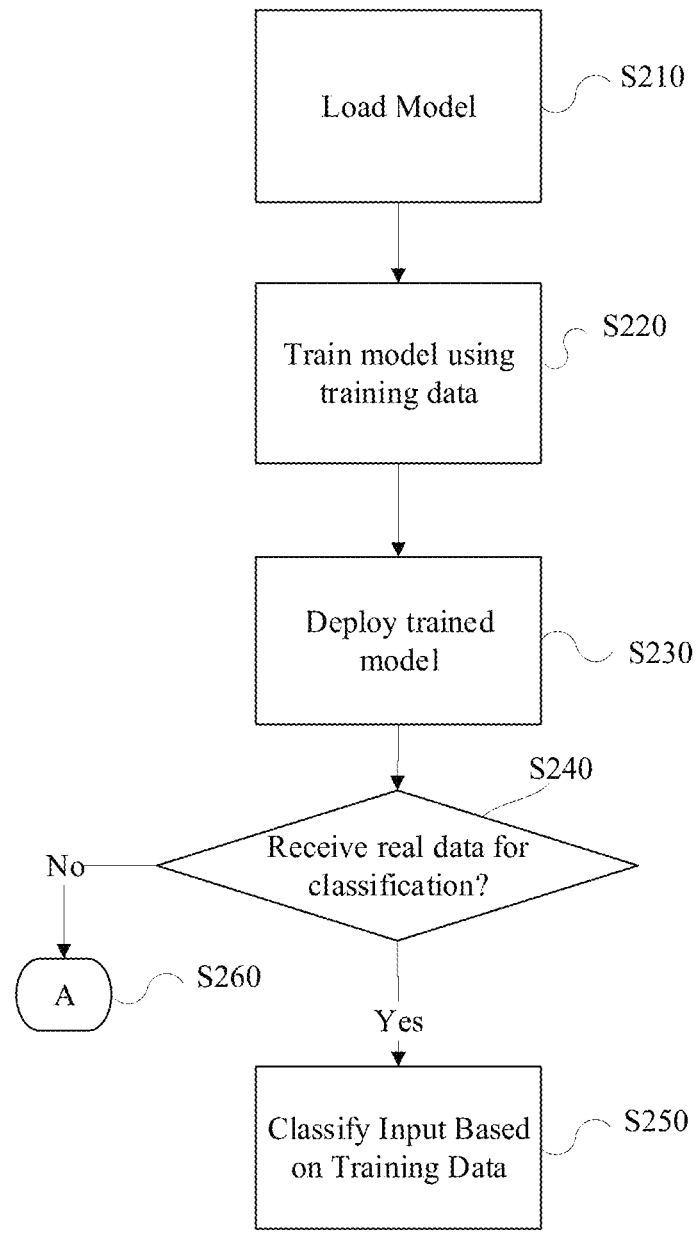
FIG. 2A is an example flow diagram of a method of training and deploying a ML model, in accordance with one or more embodiments.

Referring to FIGS. 1 and 2A, example training environment 110 and operating environment 120 for a ML model are illustrated. As shown, a computing system 122 and training data may be used to load a ML model and train the model using training data (S210, S220). Computing system 122 may be a general-purpose computer, for example, or any other suitable computing or processing platform. In the training phase, learning software 112 may be a machine learning or self-learning software that receives input training data x labeled with a tag t, where the training data is already known as belonging to a certain category.

In accordance with one or more embodiments, learning software 112 may process the training data x associated with certain features without taking the labels t into consideration (i.e., blindly) and may categorize the training data according to an initial set of weights (w) and biases (b). The generated output y may indicate that training data x is classified as belonging to a certain class by learning software 112. In one aspect, the result y may be checked against the associated label (i.e., tag t) to determine how accurately learning software 112 is classifying the training data.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of updating weights and biases over and over again. Through multiple iterations and adjustments, the internal state of learning software 112 may be continually updated to a point where a satisfactory predictive state is reached (i.e., until learning software 112 starts to more accurately classify the training data).

Once the initial training phase is completed, predictive software 114 may be deployed to process real data for classification in operating environment 120, where input data category is unknown (S230, S240). According to past training, software 114 may generate an output y that classifies the input data x as belonging to one or more categories (S250) or otherwise generate a notification or take other appropriate action (S260). In accordance with example embodiments, predictive software 114 may be a trained version of learning software 112 and may be executed over computing system 122 or another suitable computing system or computing infrastructure.

In example embodiments, the model may be deployed to analyze data or features associated with an applicant's profile, where the applicant is attempting to apply for obtaining credit or a loan. Based on the analysis of such features, an applicant may be approved or denied credit or may be assigned a certain risk score. It is noteworthy that example implementations and scenarios provided here with reference to financial transactions are for the purpose of illustration and are intended to help provide an enabling disclosure. These examples should not be construed as limiting the scope of this disclosure to particular scenarios or implementations.

Figure 2B:
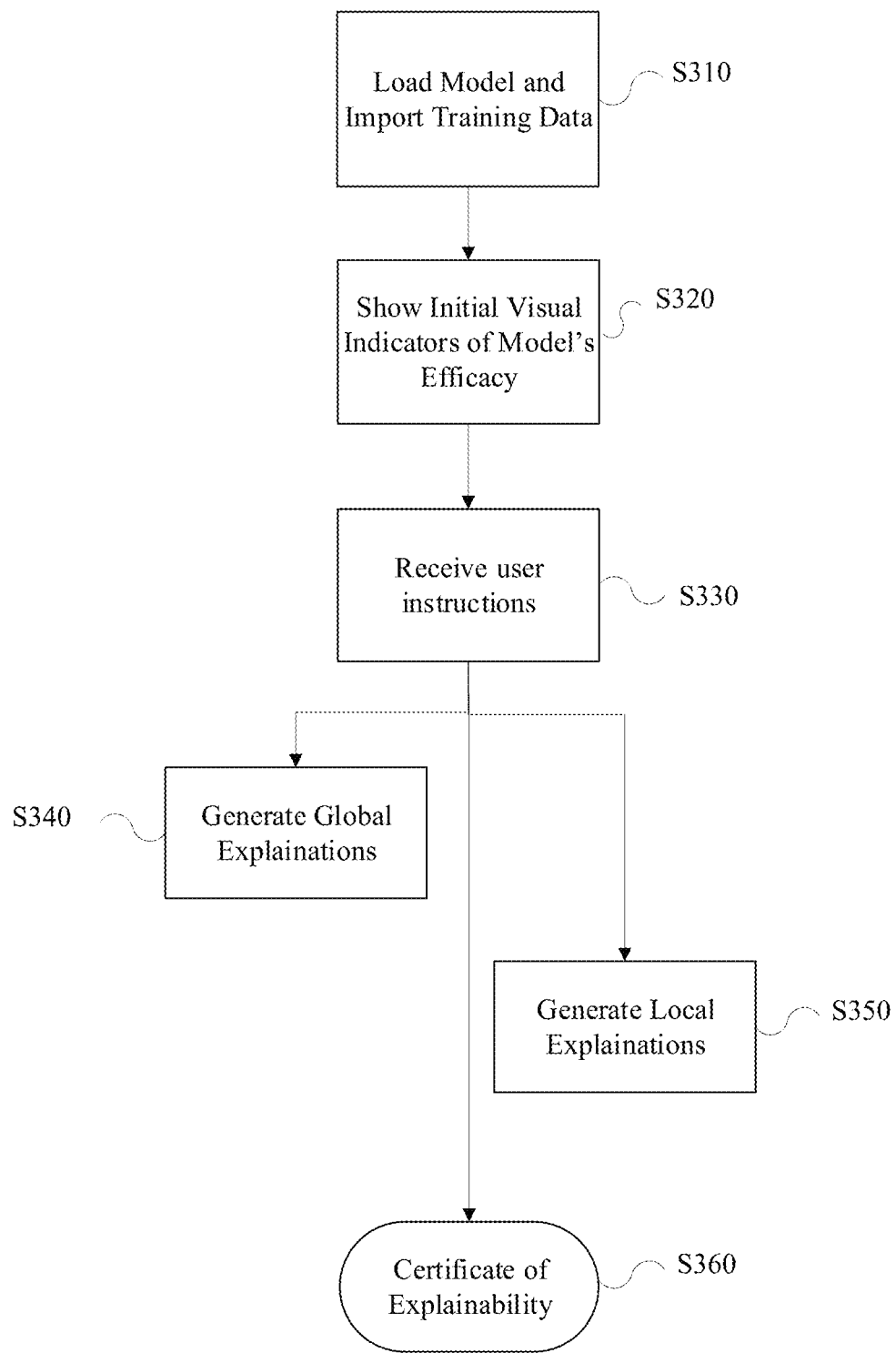
FIG. 2B is an example flow diagram of a method of providing information about the efficacy of a ML model, in accordance with one or more implementations.

Referring to FIG. 2B, in accordance with one or more implementations, a ML model may be loaded into a computing environment and training data for the model may be imported (S310). In one aspect, relationships between the model's features and one or more constraints and values used to define the model may be analyzed and initial indicators of the model's efficacy may be displayed (S320). As shown in FIGS. 3 through 21, depending on user instructions received (S330), analysis results may be used to provide an explanation of the model's behavior and functionality globally (S340) or desirably across selected local features or instances (S350), or both. The explanations may be generated during the training of the model as well as when the model is deployed. In some implementations, a certificate of explainability may be also generated (S360).

Referring to FIGS. 3 through 21, depending on implementation, provided explanations may be generated in the form of visually displayable indicators such as diagrams, charts, textual definitions or code to allow for a better understanding of the components of a target model. Moreover, the manner certain components correspond to each other or how certain components are associated with the results generated by the model may be also analyzed and disclosed. For example, features that are most important to the model's functionality or factors that most contribute to certain interesting outcomes generated by the model may be determined and graphically displayed. Further, possible correlations and interactions may be discovered and disclosed at different levels of granularity, depending on implementation or user instructions, to tell a story about the model's general and specific behavior during different instances.

The term "story" in the context of this disclosure may refer to results that explain a model's behavior (e.g., why certain results are generated, the reason for unexpected anomalies in the results, correlation or interaction among certain values and constraints used to define the model, etc.). Telling the story of a model with respect to interesting outcomes or features may help a user gain trust and provide a higher level of insight into a model's behavior. Further, providing explanations for the interesting outcomes or features may ultimately allow for a better understanding of how to modify or configure a model to achieve better or more optimal results or help design models that satisfy certain legal or practical requirements, policies or standards.

To configure or reconfigure a subject model based on the provided explanations, a user may take into account model features and characteristics that may be more important or influential in achieving certain desirable outcomes or goals (e.g., satisfying certain regulations, business policies, practical expectations, or desired performance). In example embodiments, telling the story of the model may be based on access to the model and the training data used to build the model. An example implementation for systems and methods that may achieve the above objectives may embody one or more actions or steps, for example.

Figure 3:
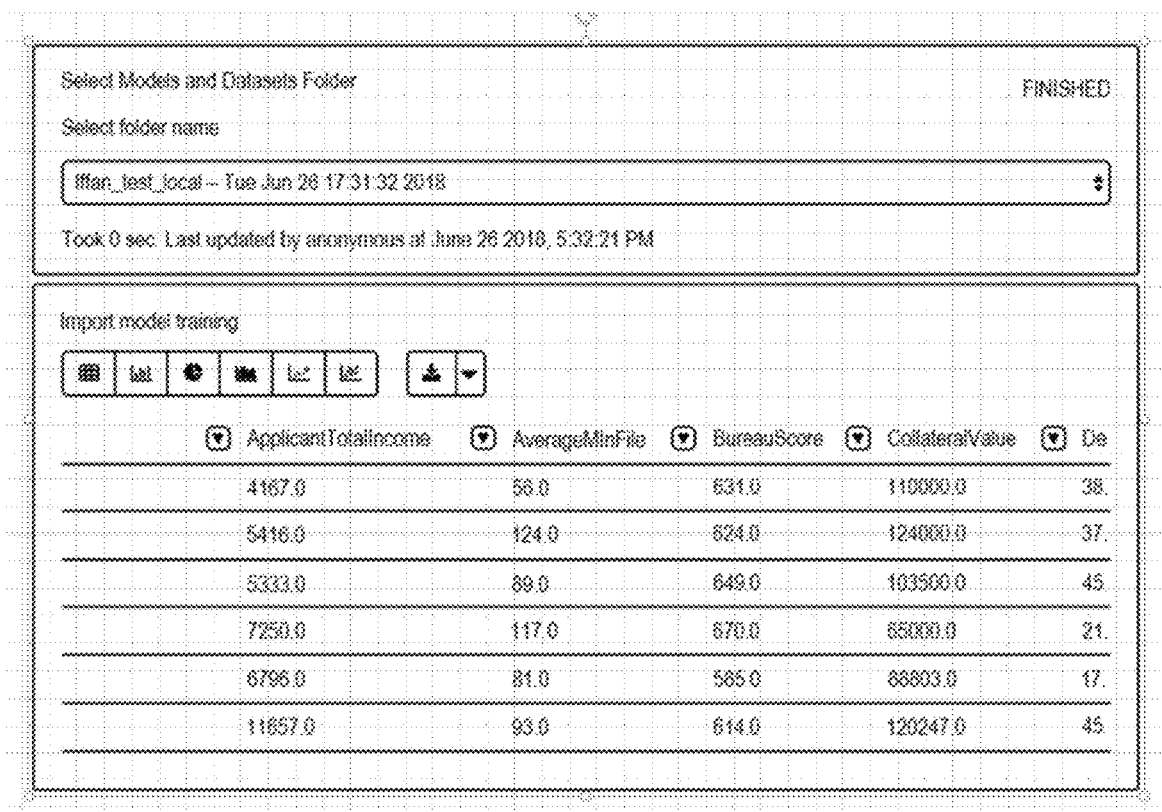

Referring to FIG. 3, in accordance with one or more aspects, a user may select a target model from a directory of defined models and may also identify training and validation data for the selected model to be imported. FIG. 3 illustrates an example interactive computing interface for selecting a model and importing the relevant data. In this example, consumer risk analysis data utilized for the purpose of training the model is imported. Using such information, a performance summary may be generated and relevant metadata about the target model may be displayed. This summery report may help provide a user with an overview of the model's performance and general features.

Appendix A attached hereto and incorporated by reference herein in entirety provides an example report that may be generated in accordance with the details and embodiments disclosed above. The report may be, for example, generated automatically and may include various levels of detail or graphical presentations, in addition to other human readable narratives and interpretations that may be concluded from analyzing the model under test and the respective set of input variables and values.

Referring to FIG. 4, an explainable artificial intelligence (XAI) knowledge kit may be utilized to generate an output on a graphical user interface. The output may provide a user with an understanding of the nature of the training or validation data for a selected model based on some statistically derived notations or statements. As shown, some of the notations or statements may be displayed in textual format with tags. Color-coding may be also introduced to help a user better understand one or more attributes associated with the dataset. This may be achieved by way of providing an overall description of the entire dataset or descriptions of each feature. For each feature, detailed statistics, histogram, common values, and extreme values may be shown.

For example, in the example illustration of FIG. 4, dataset information such as number of variables in the dataset, variable types, number of observations, number of missing data points in the dataset, total size taken up by the dataset in memory, and other meaningful information may be displayed in a predefined area of the output (e.g., on the upper portion). Additional information or warnings may be also displayed to notify a user that certain features or attributes are determine to have inter-relationships that define outlier or unexpected values. As shown, if certain features are determined to be highly correlated, skewed or missing, visual tags (e.g., rejected, skewed, zeros, etc.) may be conspicuously associated with such features to alert a user accordingly.

In certain embodiments, the user may be provided with interactive user interface options (e.g., drop down menu, or other selectable interfaces) to select a feature from among a plurality of features. In response to the selection of a feature, for example, the user may be provided with statistical descriptions for the selected feature (e.g., quantile or descriptive). As shown, if the user selected a feature associated with the source of a score calculated by the model (src_BureauScore), the output may include statistical data such as the distinct count for the feature, the uniqueness of the feature, whether the feature is missing from a target dataset, the values for the feature (e.g., the mean, minimum value, maximum value) in the dataset, and the like.

Figure 5:
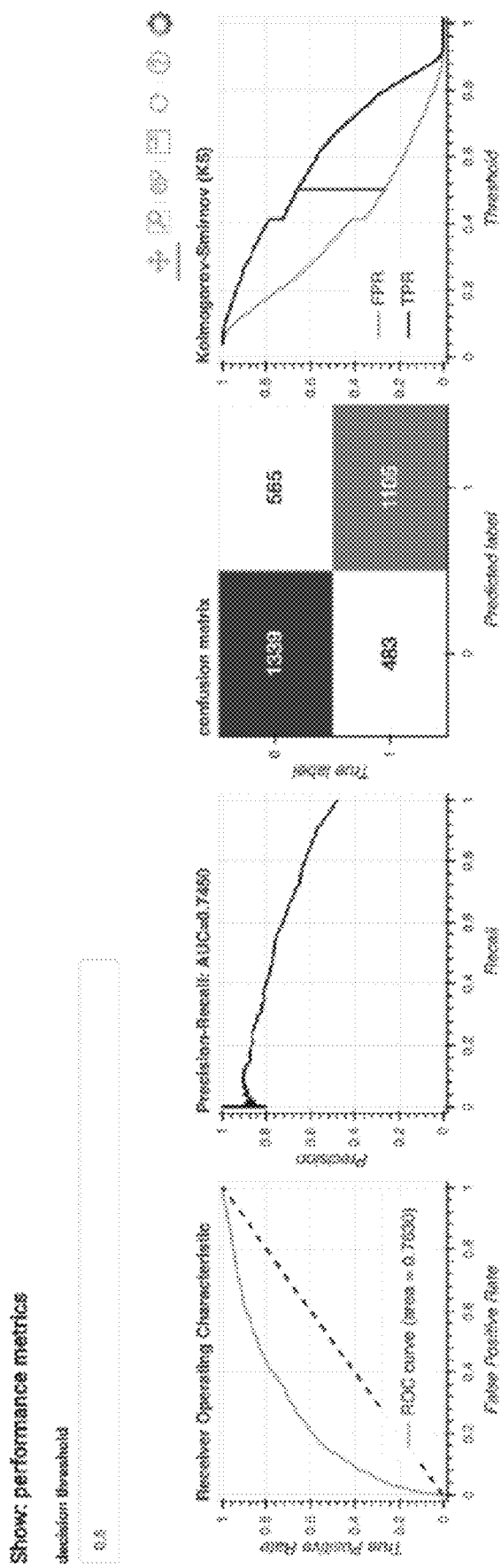

FIG. 5 illustrates examples of visual charts that may be generated to help a user better understand a model's behavior. The charts may provide a receiver operating characteristic (ROC) curve, an area under the curve (AUC), a confusion matrix, or Kolmogorov-Smirnov test results. Kolmogorov-Smirnov test results provide a nonparametric test of the equality of continuous, one-dimensional probability distributions that can be used to compare a sample with a reference probability distribution, or to compare two samples.

In certain implementations, the ROC may be used to represent the probability of a true positive rate. The AUC may be used to represent the degree or measure of separability (i.e., how accurately the model is capable of correctly classifying or predicting an outcome). A high AUC (e.g., AUC=0.98) would thus indicate that the model is highly accurate in classifying a data input in the correct category or class. In contrast, a low AUC would indicate a poor prediction performance. For example, an AUC=0.5 would indicate that the performance of the model in classifying an input is 50-50 at best.

The ROC curve may be created by plotting the true positive rate (TPR) against the false positive rate (FPR) at various threshold settings. The true-positive rate may represent the sensitivity, recall or probability of a correct prediction or classification by the model. The false-positive rate may provide an indication of the probability of error or false alarm (i.e., the probability of an incorrect prediction or classification).

The confusion matrix may be implemented as a data structure that may be, for example, visualized as a table or matrix that indicates the performance of a model, such that a row in the table or the matrix represents the instances in a predicted class, while a column represents the instances in an actual class. The visualizations provides an easy to understand indication of whether the model tends to erroneously classify an input, for example.

Thus, the ROC, AUC, confusion matrix, and other performance indicators may be utilized to provide an understanding of the performance of the model in a visual manner. It is noteworthy that the illustrative examples provided herein may be applicable to a model for credit risk analysis, which may be used to help a lender successfully select a low-risk borrower.

As shown in FIG. 5, the confusion matrix may be implemented two dimensionally ("true" vs. "predicted"), where the number of correct and incorrect predictions are summarized with count values and broken down by each class to provide an insight not only into the errors being made by the model but also the types of errors that are being made. For example, the confusion matrix in FIG. 5 indicates that out of a total of over 3,000 inputs (1,339+1,105+483+565=3,492) to the model, the majority (1,339+1,105) of the inputs have been correctly classified, and a smaller number (483+565) of the inputs have been classified incorrectly.

The confusion matrix of FIG. 5 also shows that more inputs labeled as "1" have been classified incorrectly than those labeled as "0" and more inputs labeled as "0" have been classified correctly than those labeled as "1". As such, in instances where training data is imbalanced, a viewer of the confusion matrix may determine the accuracy of the model across the training data, as opposed to simply understanding the overall accuracy of the model.

FIGS. 6 through 21 provide examples of additional visual charts or graphical user interfaces that may be provided to a user, in accordance with certain aspects, where feature importance with respect to various parameters, or the feature's monotonicity is disclosed based on an analysis of a credit risk model.

In one variation, a user may be interested in the type of feedback that would help a user understand a target model in a general context. Thus, certain embodiments may be implemented to provide a general summary of the model or global-level explanations, for example. In the global mode, a summary or general information may be provided about what the model does or how the model operates. For example, referring to FIG. 6, a visualization may be provided that summarizes a model's global behavior with respect to features and identifying which of the features is more influential in generating a certain outcome.

Figure 6:
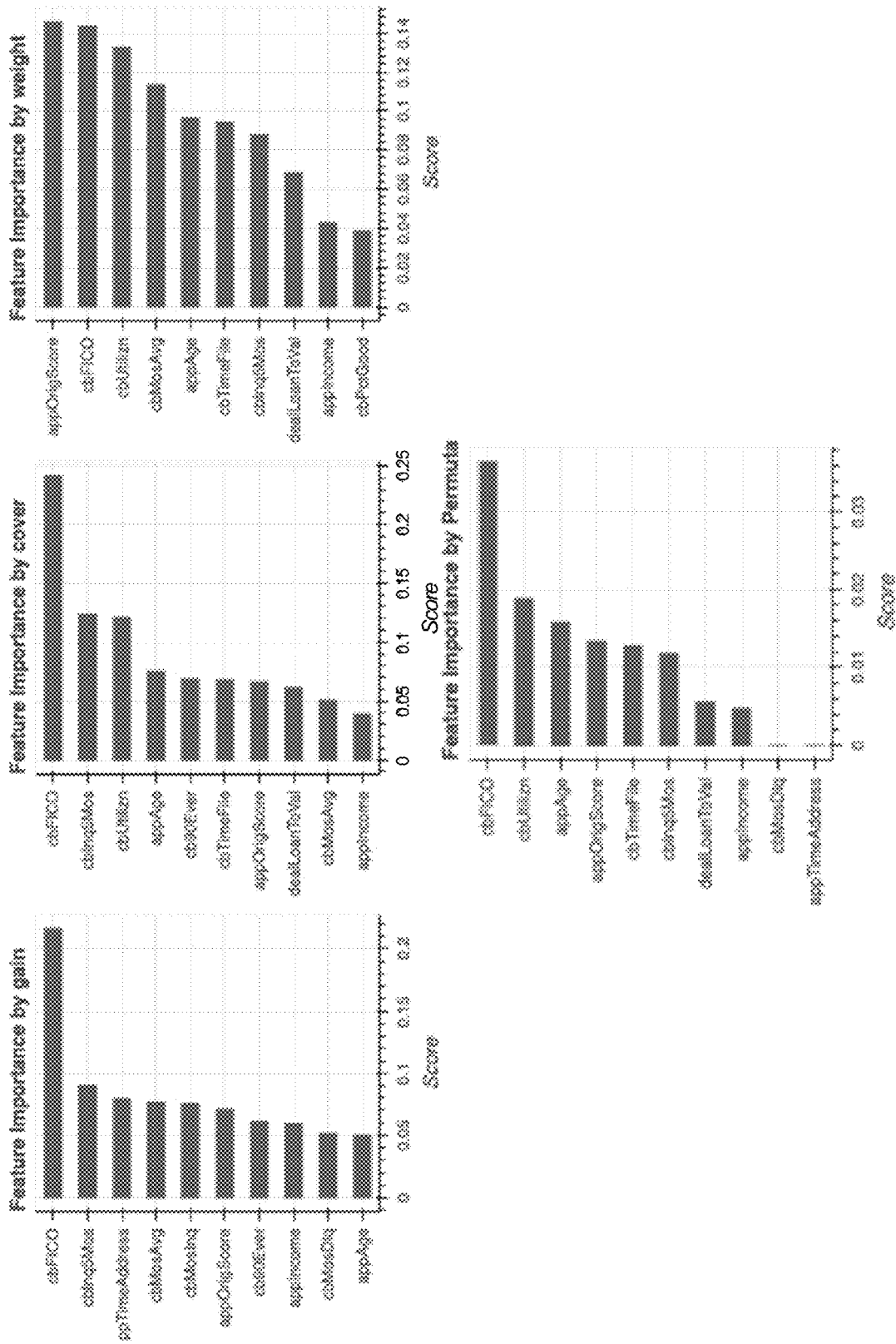

FIG. 6 illustrates, for example, a consumer risk analysis model in which the bureau score (e.g., consumer credit score) ranks highest among the features used by the model to determine risk. In other words, the generated diagram in FIG. 6 provides an easy to comprehend and interactive visual tool in form of a bar chart, for example, that would aid a user understand that, in the target model, one of the more important features in determining eligibility or risk is the credit score generated by a credit-reporting bureau. As shown in the example of FIG. 6, other more important risk determination factors may include an original score or period of time living at a certain address. Depending on implementation, more important or more contributing features, values or constraints utilized by the model may be listed in the order of importance, interest or some other logical order.

It is noteworthy that, in certain embodiments, the explanation of the model may list more important or interesting values, constraints or features, regardless of the model type used to analyze the related or target data, taking into account the specific type of model and model architecture, when listing the important features. In one model agnostic example, feature importance may be listed by permutation, which does not take into account a particular model or algorithm type when calculating the feature importance. In another embodiment, feature importance may be listed by gain, which takes into account specific structure of the analyzed model (e.g., a decision tree) and how much information was lost or gained when following a certain path. Such a tool may be equipped with both model agnostic and model specific techniques to provide a comprehensive view of a feature's importance.

Accordingly, in the example shown in FIG. 6, while bureau score remains listed as the top (e.g., most interesting, most influential, most important, etc.) factor or feature in the model, the order in which other interesting, influential or important features are listed may be different than that shown in FIG. 6. Important features corresponding to predicted outcomes of interest and degrees of importance may be illustrated. Algorithms or processes that determine feature importance may vary based on the model type. Importance by weight, gain, cover, and permutation may be provided for gradient boosted trees and random forests, for example.

Figure 7:

Referring to FIG. 7, average importance rankings for different features in the target model may be listed across one or more importance measures.

Figure 8:
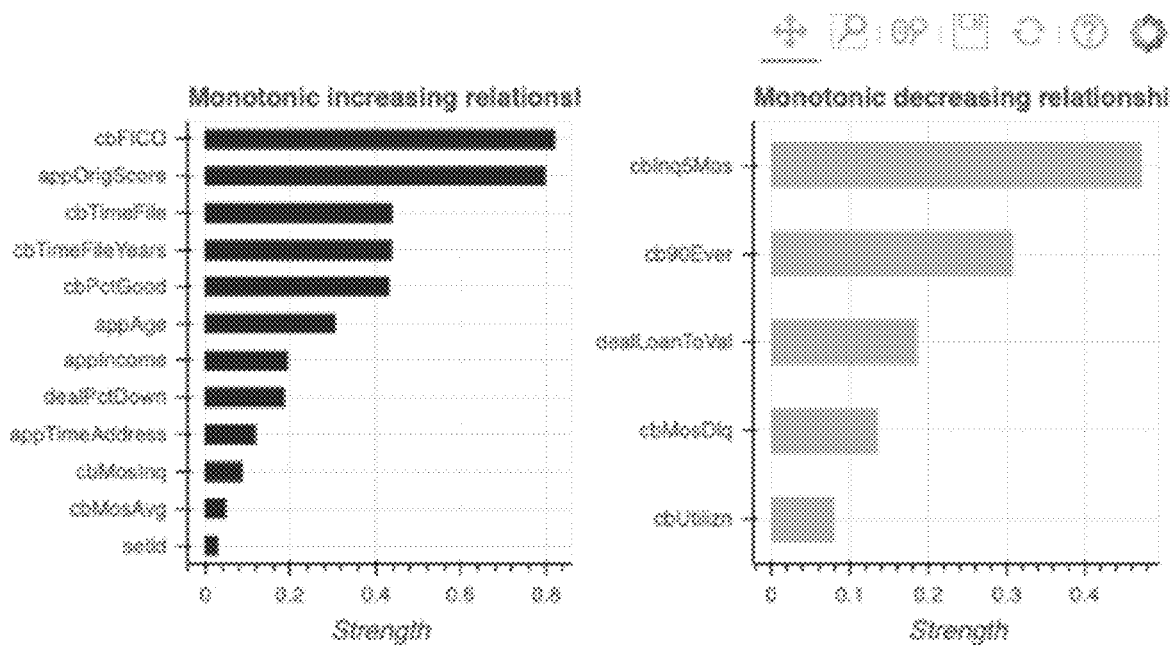

Referring to FIG. 8, an automatic monotonicity analysis example is provided that shows the features that are monotonically increasing or decreasing with respect to a target variable. As part of monotonicity analysis, selected features that are deemed important may be analyzed in more detail. Monotonicity charts may be provided that illustrate the monotonical relationship between input features and a quantity of interests, which can be the true values of a target outcome to be predicted or the predicted values of the outcome given by the model.

In one implementation, for neural network models, aggregated deep learning important features (Deeplift) and layerwise relevance propagation (LRP) scores may be provided as feature contributions to show the average relevance of each feature with respect to the target output. Deeplift provides a method for decomposing the output prediction of a neural network on a specific input by backpropagating the contributions of neurons in the network to the input features. The Deeplift scores may be computed by way of backpropagation based on finite gradients, for example. LRP may be used to determine which features in a particular input vector contribute most strongly to a model's output. The LRP scores may be obtained by calculating relevance contributions of one or more neurons recursively given the attribution proportions.

Figure 9:
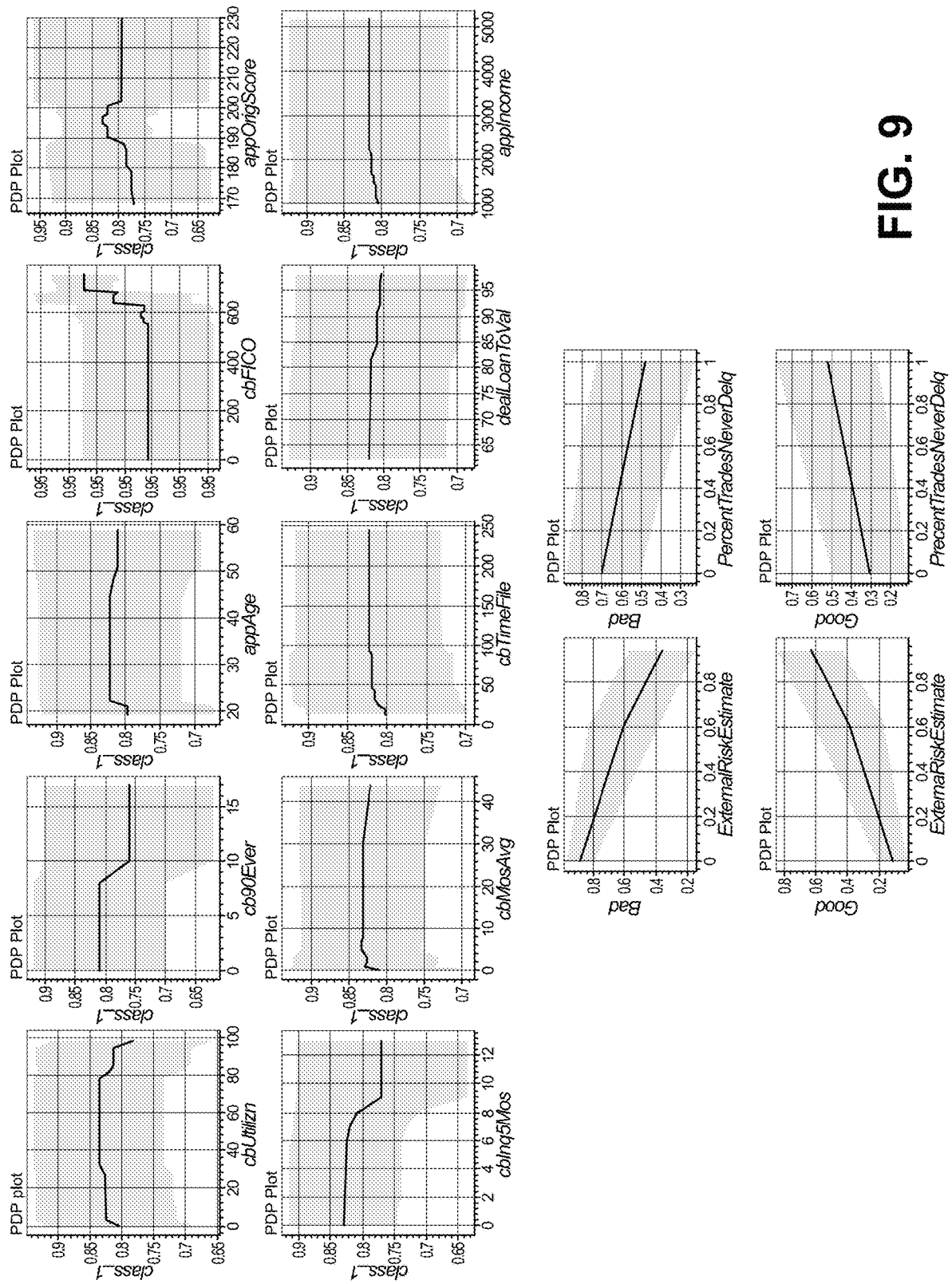

Referring to FIG. 9, partial dependency plots (PDP) may be provided in accordance with one or more embodiments. As shown, a PDP plot may show the marginal relationships between one or two features and the predicted outcome of a model. A user based on a viewing of the various plots may be reasonably informed as to whether the predicted or expected model outcomes change linearly, monotonically, or according to other relationships with respect to one or more features.

Figure 10:
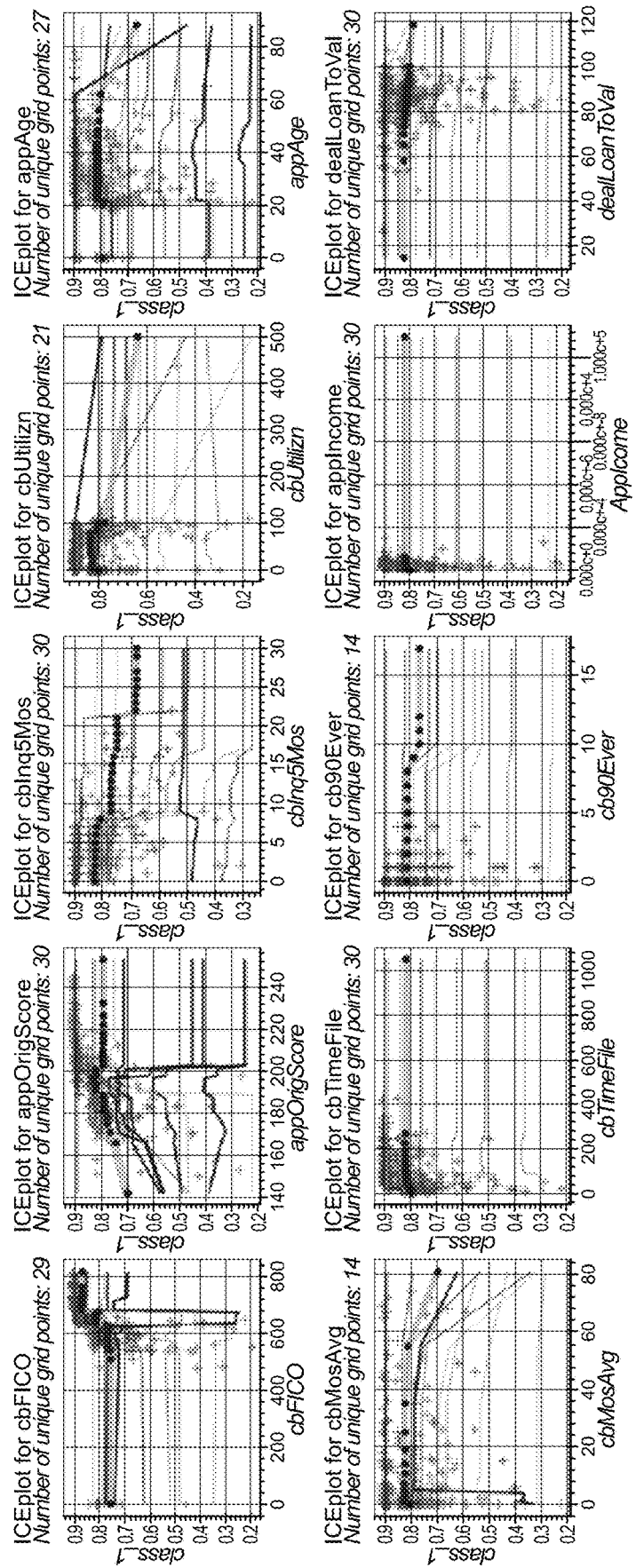

Referring to FIG. 10, during monotonicity analysis, certain features may be monotonic on average but not all the times. In at least one implementation, features that match a certain monotonic profile may be selected and a graphical analysis may be provided with ability to focus or zoom further into the details for a better understanding or insights about where and when within the selected features the monotonicity is not in agreement with average monotonicity. For example, a feature may be monotonically increasing on average but there may be instances that monotonicity is actually decreasing, while the average monotonicity is not increasing. The understanding of such discrepancies in the model helps determine how to develop correction techniques to be applied to the model, as desired.

An individual conditional expectation (ICE) plot, as shown in FIG. 10, can be implemented to illustrate de-aggregation for a partial dependence plot. An ICE plot may display individual lines of the prediction function against values of the interested features for instances of the input features. By clustering the individual prediction functions, a visualization for the ICE plot may be graphically presented that reveals patterns of the model response with respect to one or more interesting input variables, given different values of other input variables.

In example embodiments, if the illustrations show that a feature A1, in comparison to a feature A2, is always considered to be more influential in the outcome generated by the model, then a user viewing the illustration may conclude that the risk associated with relying on feature A1 may be higher than that associated with A2, for example. Automatic detection and presentation of monotonic features in a model may thus provide important or interesting clues to investigate why or how certain results or outcomes are generated and also help a user or computing entity determine model features, values or constraints that may be reconfigured or corrected or optionally maintained to achieve better or more desirable results. Accordingly, in at least one example embodiment, a report or visual indicator or presentation may be implemented to provide information about monotonic features or results generated by a model.

Figure 11:
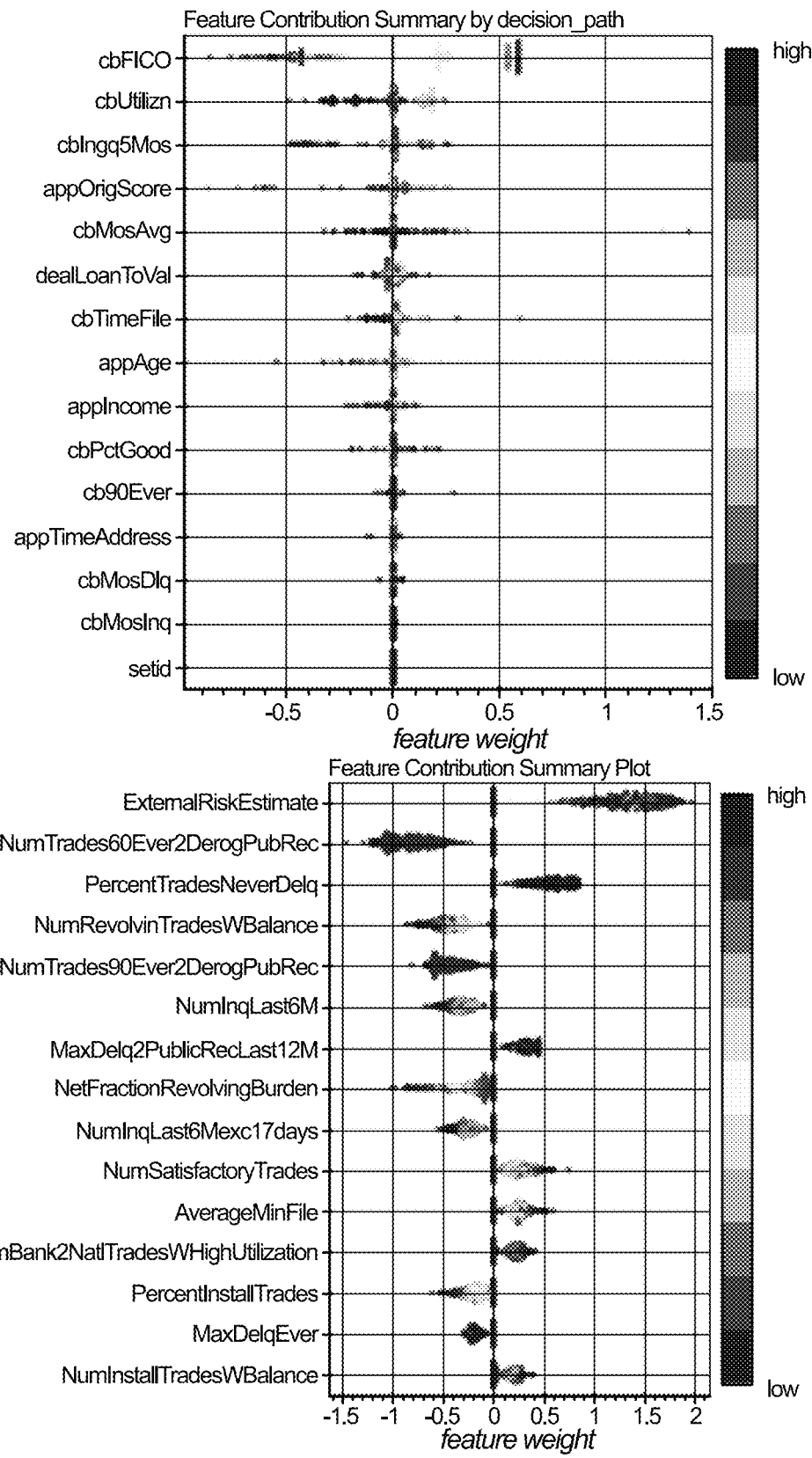

Referring to FIG. 11, aggregate feature contribution diagrams may be provided that illustrate a decision path feature contribution for a model (e.g., a model implemented based on a tree format data structure). The decision path method decomposes the prediction output as the sum of feature contributions and a bias value, where the contribution of a feature i is the average accumulation of node value differences along the decision paths in multiple trees.

Prediction=bias+contribution(feature 1)++contribution(feature n).

In the aggregate feature contribution plot, a point in the plot indicates a feature contribution weight of a single data instance. The color of the data point may indicate the feature value, where a higher feature value tends to be in a first color (e.g., red) and a lower feature value tends to be in a second color (e.g., blue). The ranking of the features, from top to bottom, may indicate the ascending (or descending, depending on implementation) order of the accumulated absolute feature contribution weights. The user can infer from the plot what the top contributing factors in the model are, or determine feature value distribution in the input data, and the monotonicity trend with respect to model response from this single plot.

Figure 12:
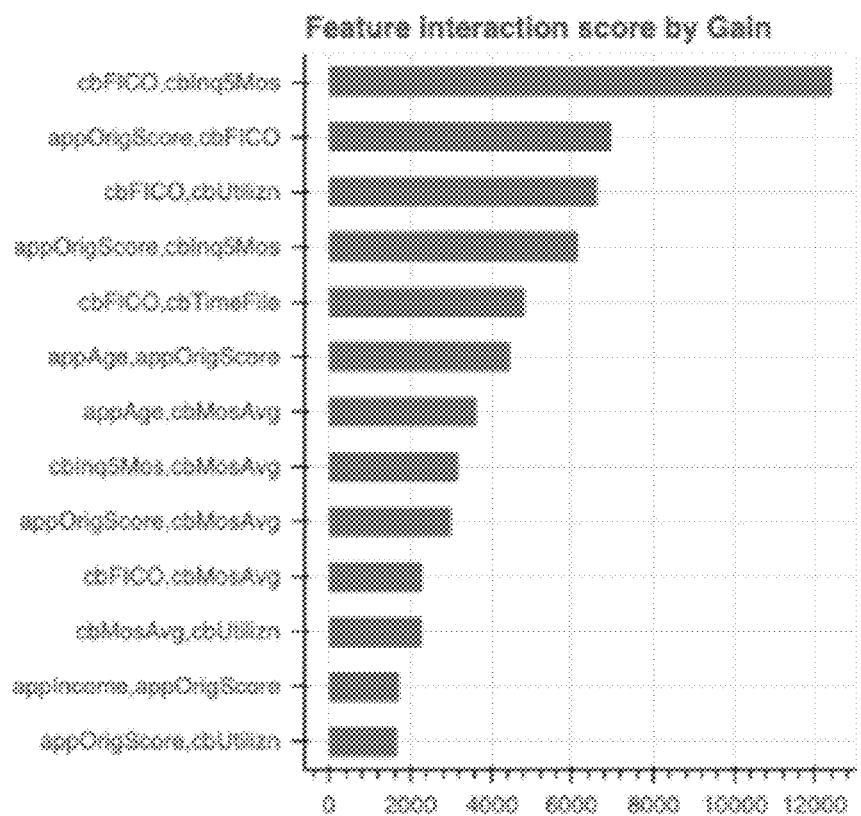

Referring to FIG. 12, a graphical interface may be provided to plot feature interaction score by gain, for example. In the chart illustrated in FIG. 12, top feature interaction in a model may be represented to a user, where a top feature interaction by gain with interaction length d measures the feature interaction importance for a d-tuple of features by collecting all paths in trees of length d and summing the gains along that path.

For tree-based models, another way to quantify feature interaction is the aggregated feature interaction by decision path, which works by accumulating the feature interaction weights on a sample of local prediction instances. In a single decision tree, for one prediction instance, the value of the leaf node on the respective decision path can be written as value=bias+contribution(feature 1)+contribution(feature 1, feature 2)+ . . . +contribution (feature 1, feature 2, . . . , feature n). For a local prediction instance, the feature interaction weights may be averaged over the decision paths in the trees. In such implementation, the feature tuple which has a high accumulated absolute contribution score ranks high in feature interaction.

Figure 13:
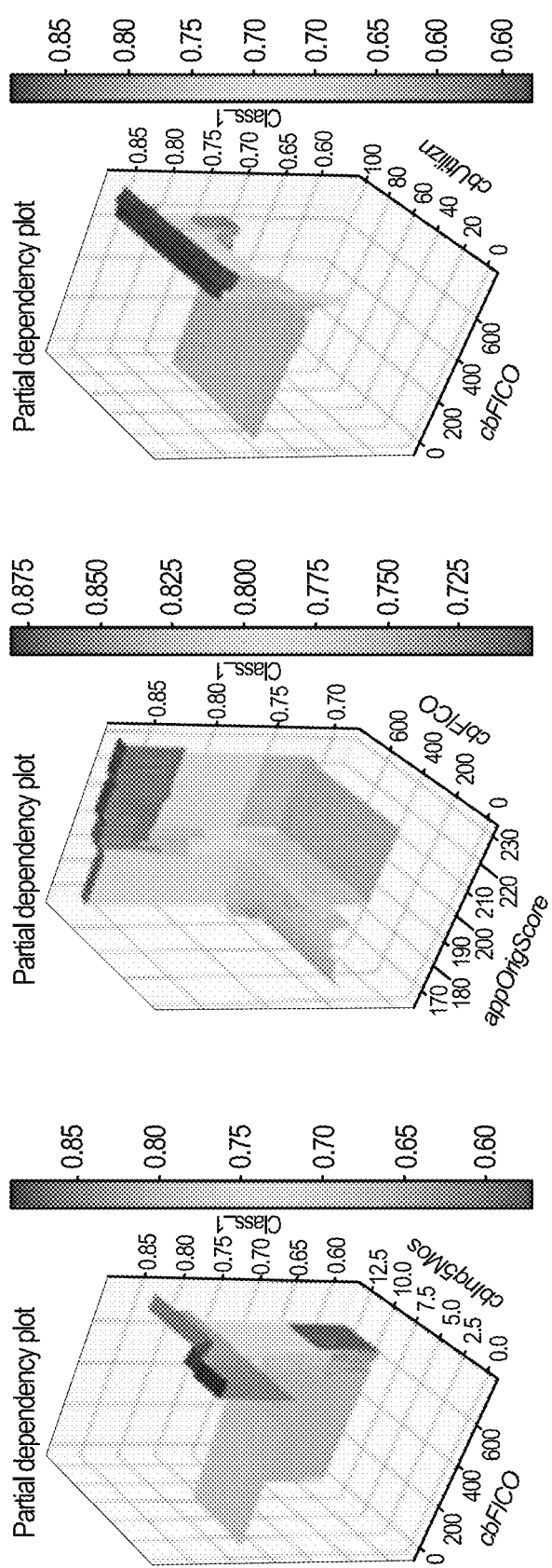

Referring to FIG. 13, a pairwise partial dependency plot on top feature interactions may be graphically displayed in accordance with certain embodiments, optionally in a three-dimensional (3-D) format. In a 3-D pairwise partial dependence plot, the x axis and they axis may provide the values of the pair of interesting features, respectively. The z axis may provide the surface of the partial dependence function, for example.

In one or more embodiments, one or both model-dependent and model-independent methods may be used to explain various features of a model. Feature relationships offer useful information that provide another window into the functionality of a model, providing a better understanding of the nature of a model, its performance and accuracy, for example. In example embodiments, understanding the relationship between predictors and a conditional average treatment effect (CATE) may be provided by way of a PDP. One or more PDP may be utilized to mark the change in the average predicted value, as specified features vary over marginal distributions. In accordance with one variation, PDP may show the average effect of a feature, as a global method for explicability. In other variations, PDPs may be model predictor response relationships under various classification costs, such as asymmetric classification.

If features of a machine learning model are correlated, the computation of a partial dependence plot (PDP) for a feature that is strongly correlated with other features involves averaging predictions of artificial data instances that are unlikely to occur. This can create bias when estimating the influence of a feature on the predicted value of a machine learning model. A precision aggregated regional effect (PARE) plot may be used to illustrate the averaged influence of features on the predicted value of a machine learning model, when the correlated features exist.

A PARE plot is similar to a PDP because the calculated values are estimates of the prediction. First, the feature values are partitioned into a fixed number of regions. Then, a reference feature value is used as a starting point for PARE. The PARE of the reference feature value is computed in a way that is similar to PDP but only considers the samples in the local region of the reference feature value. Starting from the reference feature value, the PARE is computed by accumulating regional effect, which is modeled by the average difference of the prediction between the end points of each region for a given feature while keeping other features fixed, from the reference feature value. The PARE plot can be used as an unbiased estimate of a feature's marginal influence on the predicted value when there are other correlated features in the dataset.

Figure 14:
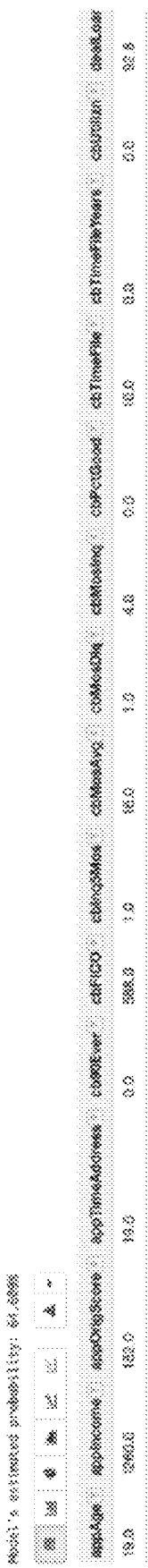

Referring to FIG. 14, a graphical user interface is illustrated that shows a local explanation for a model, which in addition to explaining the model the interface also provides explanations for prediction instances. The prediction instances may include instance level explanations, such that given a single prediction instance, sensitivity analysis, feature contribution analysis and correction search may be performed. As provided in further detail below, in addition to providing instance explanations for a model, it may be possible to select plausible values which allow for migrating values and constraints that define a model toward results that are statistically supported by historic data, for example.

Figure 15:
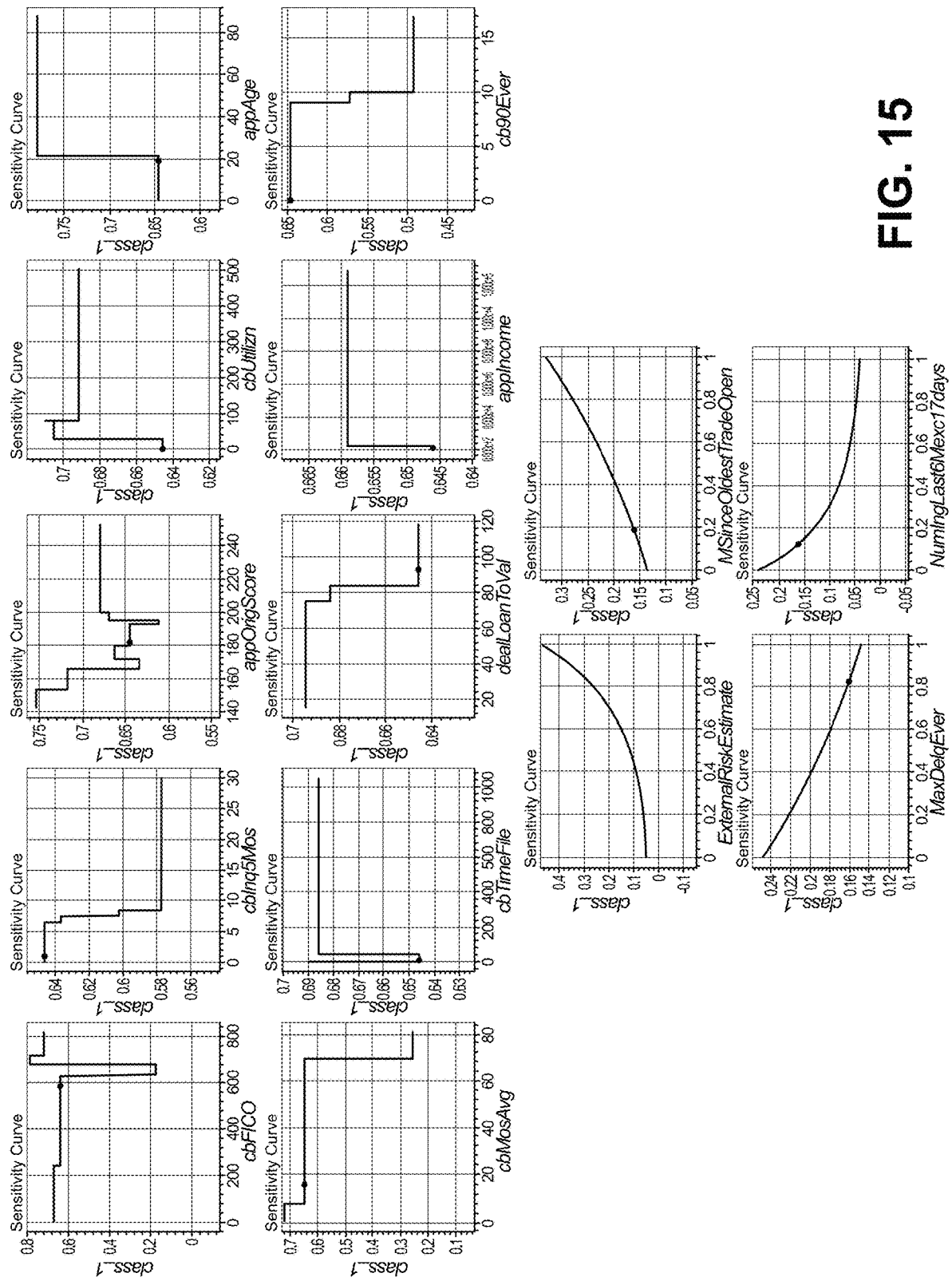

Referring to FIG. 15, instances of prediction changes for one or more variables in a model may be determined. Such changes may also be better understood in terms of the sensitivity of the model to the features. In an example sensitivity analysis, a feature for a record may be arbitrarily varied across the feature's natural domain. Accordingly, depending on implementation, a sensitivity analysis may be configured by perturbing one input variable at a single prediction instance, while keeping all other input variables constant. As shown, sensitivity curves may be represented in a chart format for an instance given either a tree ensemble model (the top figure), or a neural network model (the bottom figure).

Figure 16:
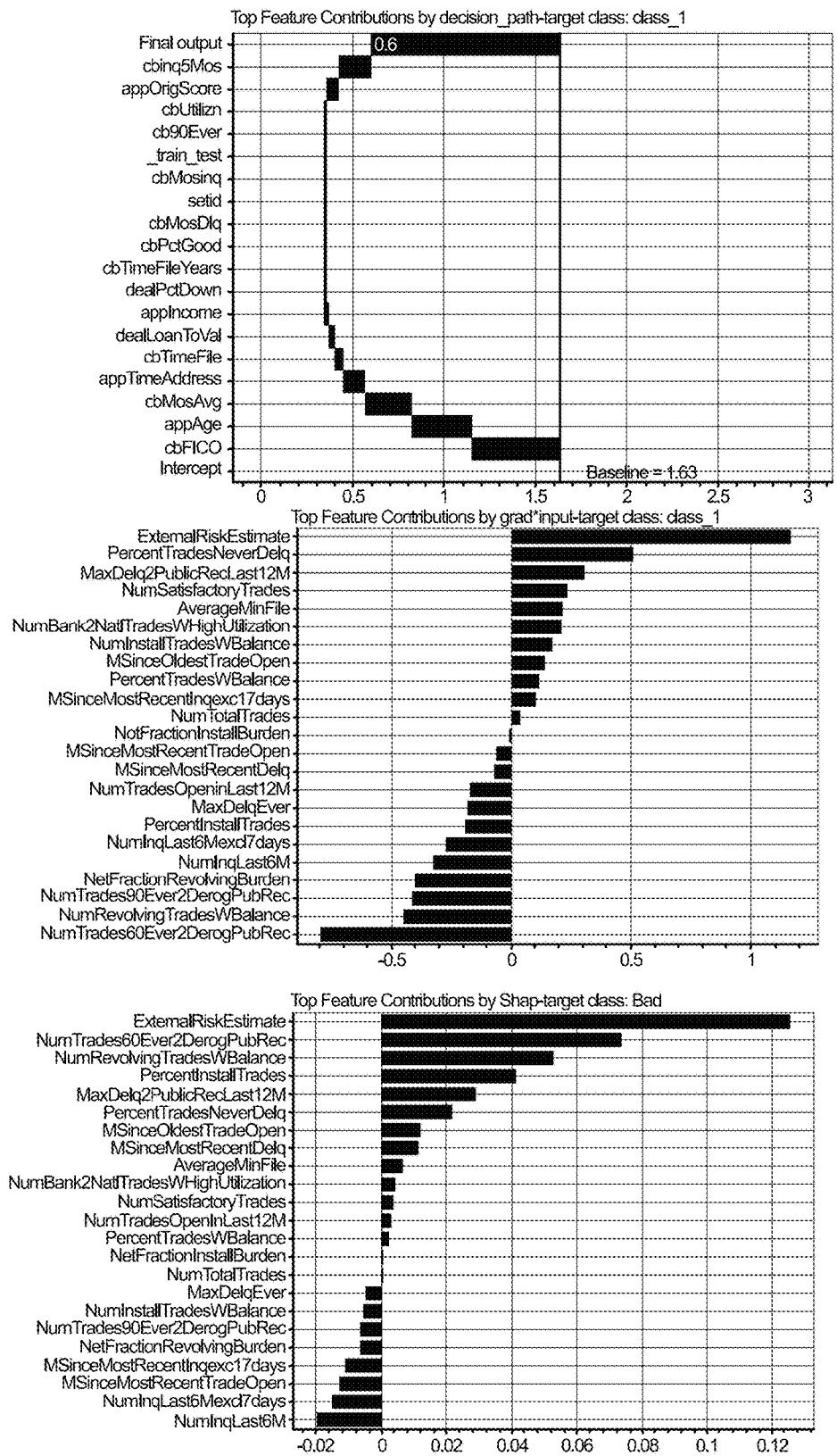

Referring to FIG. 16, a graphical interface may be provided for a local feature contribution score that decomposes the single prediction output of a model into a selected bias plus sum of contribution scores for a plurality of features in a model. In one example, shapley additive explanations (SHAP), which is a unified model-agnostic approach to explain the output of a machine learning model, may be utilized to represent consistent and locally additive feature contributions. For models including tree ensembles and neural networks, SHAP values of a feature may be presented given the model prediction on a single data instance.

Referring to FIG. 17, in some embodiments, a summary of the model may be provided by way of generating readable code that identifies different states or actions taken by the model depending on the occurrence of certain events or satisfaction of certain constraints. As shown, an example code may be generated to provide an understanding of the general behavior of the model and the internal functionality built into the model.

For example, a user reading the logic code in FIG. 17 would be able to better understand the driving factors, and the respective order of influence and how satisfaction of certain constraints may result in a certain outcome. In an example scenario, if the model constraints define the value of a certain variable as equal or between certain values (e.g., belonging to a defined range), then a borrower associated with those variable values may be identified as being in a good risk category. Otherwise, the borrower may be identified as belonging to a bad risk category, for example.

Referring to FIG. 18, correction example searches may be provided to indicate possible changes to an instance's feature values that would shift the projected score to the other side of the decision threshold. Among such shifts, those that are minimal and plausible may be selected. Minimal in this context refers to demand changes to the fewest number of features and by their minimal distance. Plausible refers to migrating to positions in X space that are also occupied by data (i.e., points for which statistical support and direct evidence is collected that show such features exist).

Referring to FIG. 19, an example user interface for generating adverse action reason codes is provided. As shown, when a user provides a mapping from model input features to human-understandable reasons, human-readable reasons may be generated for why a certain decision is made, by accumulating the distance to max value in the sensitivity curve, or the contribution weight for the variables of the same kind.

In certain embodiments, a minimum required features (MRF) subset method may be utilized to find a sparse set of features (e.g., a minimum required features subset) for a given prediction instance, such that by keeping the features in the MRF unchanged, and by masking other features to uninformative values, the model prediction output may retain to be the same classification outcome. In the existing MRF method, the mask value for uninformative features is constant across the dataset. In this implementation, a dynamic mask may be generated for each input record which adversely affects the prediction output. Compared to the static mask, the adverse mask enables the finding of more robust minimum required features, such that when the masked features are subject to some perturbations, the model prediction can still retain the same outcome with a large probability.

Figure 20:
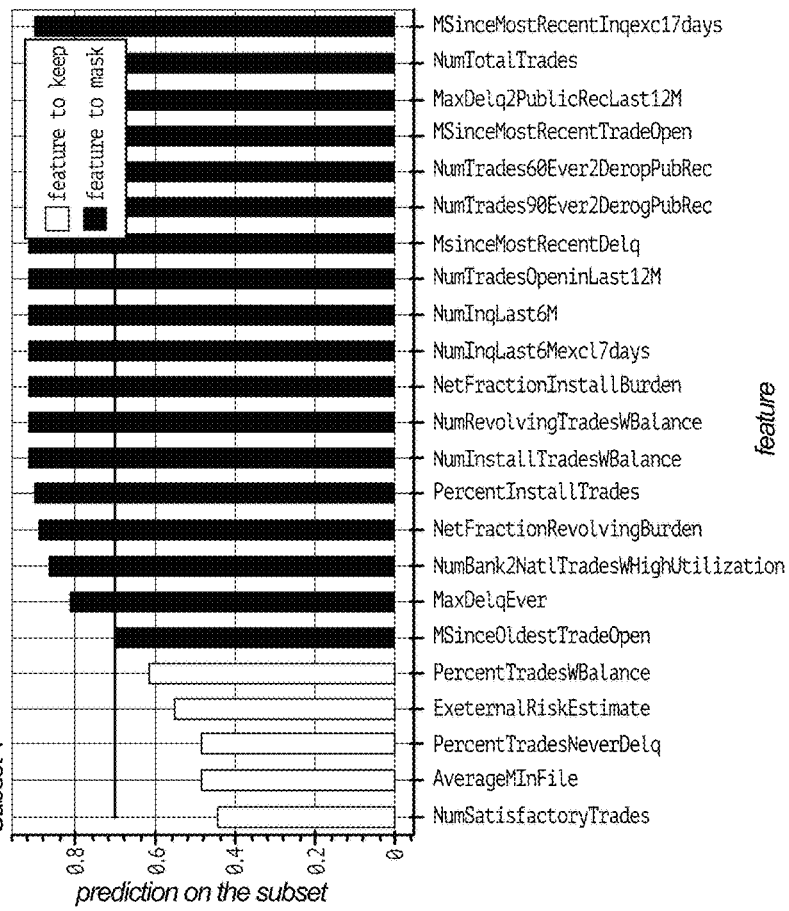

Referring to FIG. 20, a graphical interface may be provided for the minimum required features subset found for a local prediction instance. The visualization together with the textual explanations show the important features to keep in the subset to achieve the same desired decision threshold even when other features are masked. The height of each bar indicates the prediction outcome when all features to the right of this bar are masked while keeping the features to the left of this bar unchanged.

Figure 21:
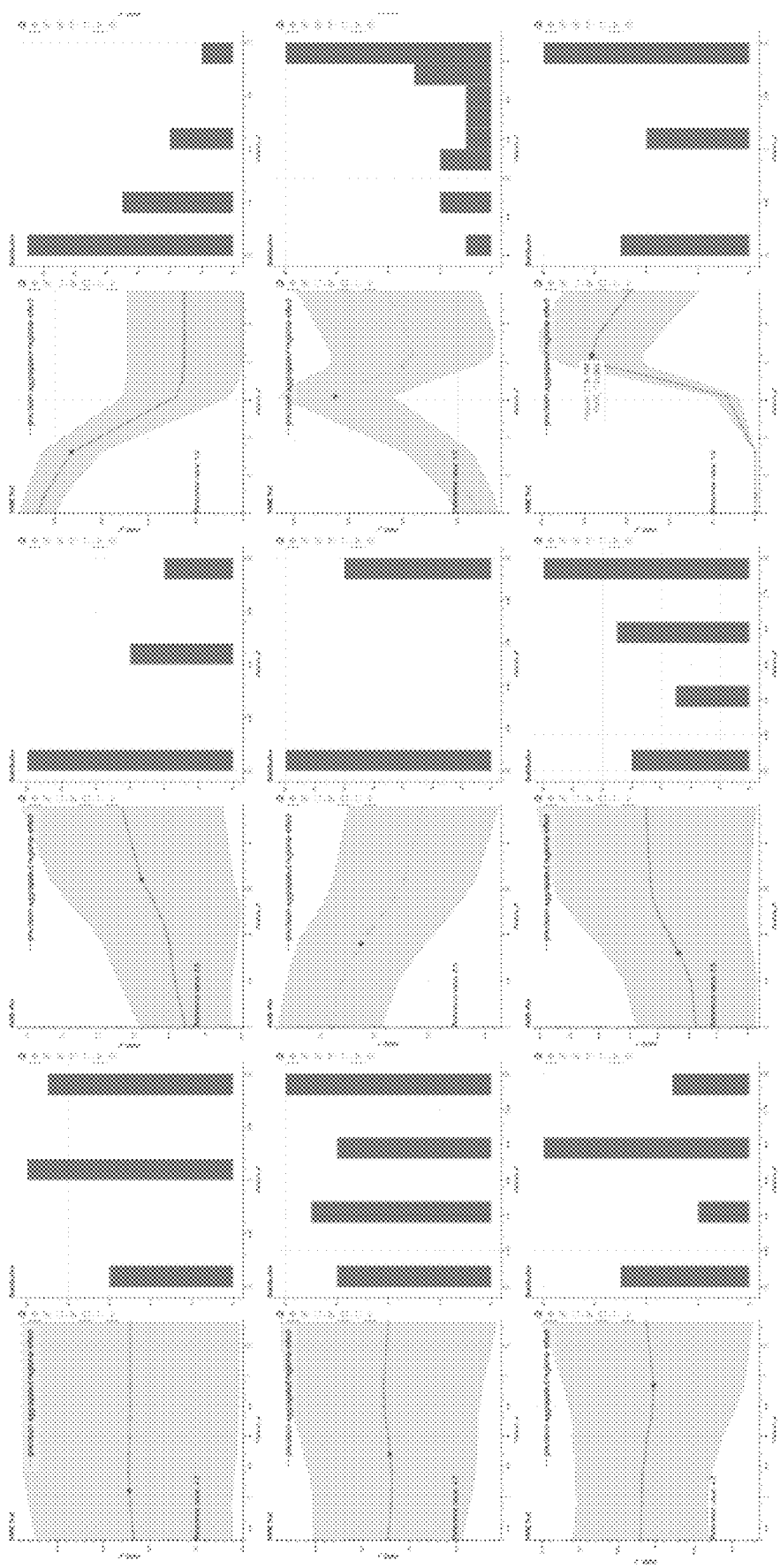
Figure 22:
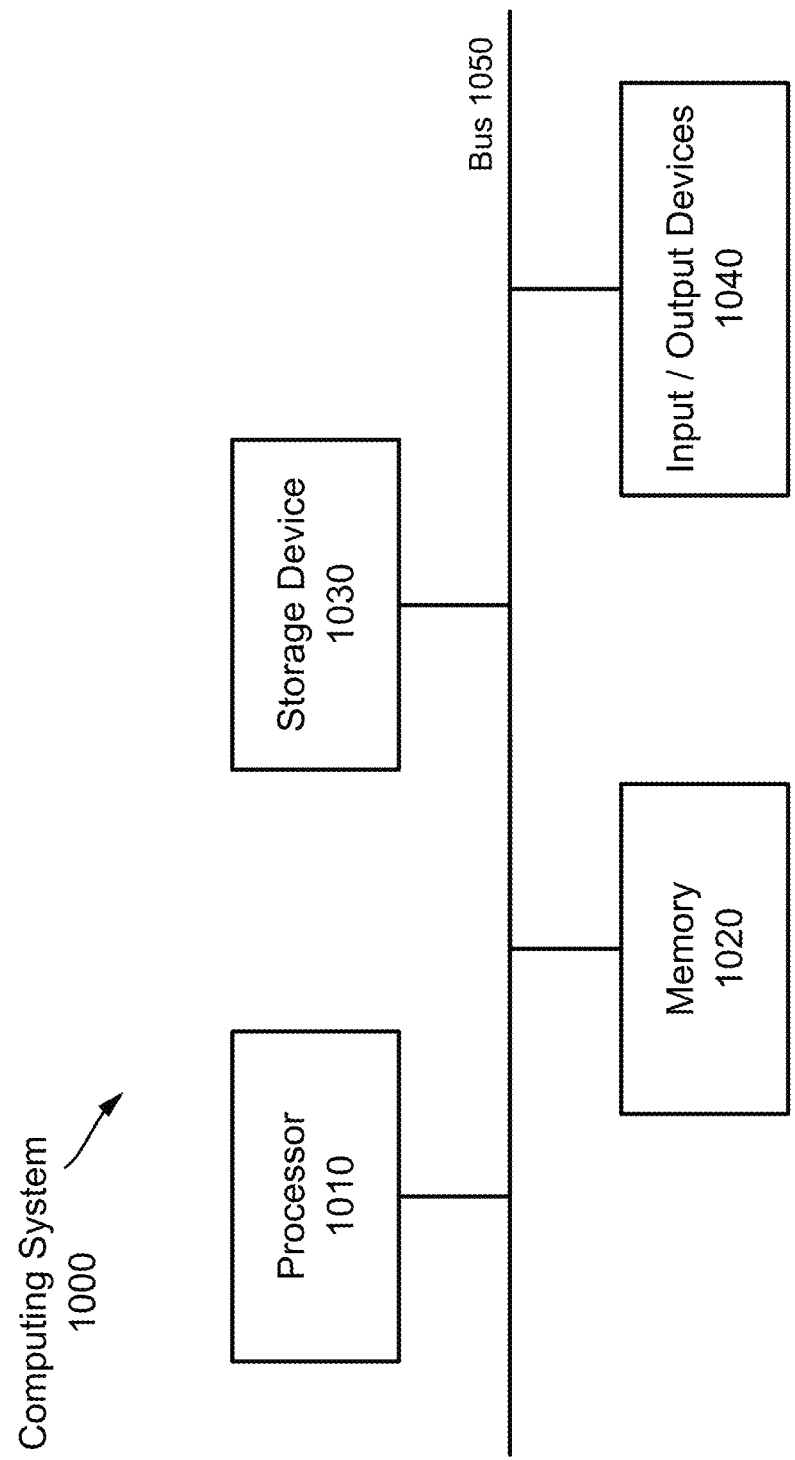
FIG. 22 is a block diagram of a computing system consistent with one or more embodiments.

Referring to FIG. 21, one or more PARE plots may be provided, in accordance with one or more embodiments. As shown, a PARE plot may illustrate the unbiased estimation of the marginal relationships between one or two features and the predicted outcome of a model when the features are correlated in the machine learning model. The histogram of each region which is used to compute the PARE is also appended to the PARE plot.

Provenance instances and scores for neural network models may be provided by way of an XAI that provides information about instances which have most positive and negative influence on the model performance, which are called provenance instances. The strengths of influences given as the provenance scores. In such implementation, model performance would be leveraged if positive provenances are within the training data set, meanwhile, the model performance would be harmed if negative provenances are within the training data set.

In one or more embodiments, a certificate of explainability may be provided to, for example, certify that the generated results or predictions that are used for explaining the global and local characteristics of the model under test are trustworthy to a certain degree of probability (e.g., distance to target or correcting behavior). The certificate of explainability may include a set of descriptions and interactive visuals that provide information for an instance-level prediction to be trusted. Depending on the intended audience, the certification generated may include information at varying degrees.

Embodiments of the disclosed subject matter may adopt a model dependent or model independent approach depending on implementation, where a plurality of methods may be utilized for explaining a model. One method may include calculating feature importance categorized at a high level as either model-dependent or model-independent. A model-dependent approach may take into account the unique properties of a given machine learning system (e.g., a feature's importance) when explaining the model. In one embodiment, the model-dependent approach may be specific to some techniques. An example technique may be the Gini index for tree-based techniques (e.g., Random Forest), which falls under the category of purity methods. The Gini index may be used to calculate the sum of impurity decrease for each variable over nodes in trees. This approach is simple and has minimal overhead. However, such approach may include biases, preferring categorical variables at many levels, which may mislead the feature importance. Therefore, a model-independent analysis that would obviate such biases may be also implemented.

In accordance with one aspect, model-independent approaches may not be specific for a model or process family and may be used to assess a black-box model (i.e., a model in which the internal functionality or implementations of the model is unknown or obfuscated). For example, permutation importance method may be used to randomly permute a feature to determine how the model performs in the presence of perturbed data. This approach may be implemented based on brute-force, and thereby may involve a substantial level of resources for complex models. However, such approach may perform better than model-dependent counterparts for specific methods, such as Gini index in Random Forest. In such an example, when the data is highly correlated (e.g., when permuting a feature), the feature may be assumed to be independent of other features, as well as the label. In some implementations, to calculate feature importance, conditional permutation importance or other importance indicators such as SHAP values may be used instead to consider the correlations.

As such, in a global explanation mode, visual or textual results may be generated to provide an understanding of how the model behaves with respect to the predicted outcomes of interest and the degree by which certain features may influence such outcomes. Additionally, the level of importance or contribution to the outcome or the level of interaction or association of features in a model may be also provided, where applicable. Association, as used here, may refer to a correlation between two features such that a change in the first feature value is associated with a change in a second feature value. Interaction between two feature values may refer to the possible influence a change in the first or the second feature value may have on a target value.

In contrast to the global explanation mode, in a local explanation mode, explanations may be provided for one or more predictions performed by the model in a detailed or instance context. In other words, in addition or instead of providing a general summary of the model behavior, one or more explanations may be provided that explain a predicted instance. Instance level explanations may involve analyzing and disclosing the behavior of a target model at identified execution slices in which particular model features, constraints, values or variable correlations are identified and tracked for the purpose of understanding how a value, a feature change, or a defined constraint derives the prediction.

For example, it may be interesting to know or determine how possible changes to an instance's feature values may adjust or shift the expected results or projected outcome (e.g., the calculated risk score for a borrower) beyond acceptable or unacceptable thresholds or ranges (i.e. possible correctional behavior). Thus, by having an understanding of how certain instances in a model behave, it may be possible to select or tune the model to select outcomes that best suit an expected result by, for example, choosing minimal means (e.g., instances that demand changes to the fewest number of features or instances that require least amount of change to the most important features, etc.).

Referring to FIG. 20, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 20, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for providing insights about a machine learning model, wherein the machine learning model is trained, during a training phase, to learn patterns to correctly classify input data associated with risk analysis or risk predication, the method comprising:
   analyzing one or more features of the machine learning model, the one or more features being defined based on one or more constraints associated with one or more values and relationships and whether said one or more values and relationships satisfy at least one of the one or more constraints;
   displaying one or more visual indicators based on an analysis of the one or more features and training data used to train the machine learning model, the one or more visual indicators providing a summary of the machine learning model's performance or efficacy;
   in response to further analyzing the one or more features and the training data, providing at least one or more of: a global explanation about the machine learning model functionality and a local explanation about a given instance, and generating a report including results summarizing the global or local explanations; and
   providing a certificate of explainability to certify the results summarizing the global or local explanations are trustworthy to a first degree of probability,
   the global explanation providing general information about one or more functionalities of the machine learning model and a visualization that summarizes the machine learning model's global behavior with respect to the one or more features that are influential in generating one or more identifiable outcomes, the global explanation further providing a level of importance or contribution of a first feature from among the one or more features to at least one identifiable outcome, and a level of interaction or a level of association between the first feature and a second feature from among the one or more features, and the local explanation providing an understanding of how possible changes to the instance's feature values adjust or shift an expected result or projected outcome beyond a first threshold.

2. The method of claim 1, further comprising determining one or more provenance instances with most positive or most negative influences on at least the first feature, wherein the level of association between the first feature and the second feature refers to a correlation where a change in value of the first feature is associated with a change in value of the second feature and the level of interaction between the first feature and the second feature refers to a possible influence that a change in the values of the first feature or the second feature has on a target value in the at least one identifiable outcome.

3. The method of claim 2, further comprising assigning a first score to a first provenance instance from among the one or more provenance instances, the score being indicative of how strongly the first provenance instance influences the at least first feature.

4. The method of claim 2, further comprising assigning a first score to a first provenance instance from among the one or more provenance instances, the score being indicative of how positively or negatively the first provenance instance influences the at least first feature.

5. The method of claim 4, wherein including the first provenance instance, with a positive influence score, in the training data results in an enhancement to the learning model's performance.

6. The method of claim 1, wherein the further analyzing is performed based on at least one of a model-dependent approach or a model-independent approach.

7. The method of claim 6, wherein the model-dependent approach takes into consideration unique properties of the machine learning model, including a feature's importance to the machine learning model's operation to correctly preform a prediction based on the input data.

8. The method of claim 1, wherein the local explanation provides one or more predictions performed by the machine learning model in one or more instances.

9. The method of claim 8, wherein a first instance from the one or more instances comprises one or more execution slices in which at least one or more of the machine learning model's features, constraints, values or variable correlations are identified and tracked for the purpose of understanding how the machine learning model derives a prediction in the first instance.

10. The method of claim 9, wherein the local explanation provides an understanding of how possible changes to an instance's feature values adjust or shift an expected result or projected outcome.

11. The method of claim 10, wherein a first threshold is determined and the local explanation provides an understanding of how possible changes to the instance's feature values adjust or shift an expected result or projected outcome beyond the first threshold.

12. The method of claim 10, wherein in response to understanding how the machine learning model behaves in the first instance, the machine learning model is tuned to select outcomes that best suit an expected result in a first set of instances.

13. The method of claim 12, wherein the machine learning model is tuned by adjusting instances that demand changes to the fewest number of features or instances with a least amount of change to the most important features of the machine learning model or by selecting a training data set for training data that includes instances that provide a better outcome or result for the machine learning performance.

14. A system comprising:
at least one programmable processor; and
a non-transitory machine-readable medium storing instructions that, when executed by the at least one programmable processor, cause the at least one programmable processor to perform operations comprising:
analyzing one or more features of the machine learning model, the one or more features being defined based on one or more constraints associated with one or more values and relationships and whether said one or more values and relationships satisfy at least one of the one or more constraints;
displaying one or more visual indicators based on an analysis of the one or more features and training data used to train the machine learning model, the one or more visual indicators providing a summary of the machine learning model's performance or efficacy;
in response to further analyzing the one or more features and the training data, providing at least one or more of: a global explanation about the machine learning model functionality or a local explanation about a given instance, and generating a report summarizing the global and local explanations,
the global explanation providing general information about one or more functionalities of the machine learning model and a visualization that summarizes the machine learning model's global behavior with respect to the one or more features that are influential in generating one or more identifiable outcomes, the global explanation further providing a level of importance or contribution of a first feature from among the one or more features to at least one identifiable outcome, and a level of interaction or a level of association between the first feature and a second feature from among the one or more features;
determining one or more provenance instances based on most positive or most negative influences on at least a first feature associated with the machine learning model's behavior or performance; and
assigning a first score to a first provenance instance from among the one or more provenance instances, the score being indicative of how positively or negatively the first provenance instance influences the at least first feature,
the local explanation providing an understanding of how possible changes to the instance's feature values adjust or shift an expected result or projected outcome beyond a first threshold at identifiable execution slices in which the one or more features and associated constraints, values or variable correlations are identified and tracked.

15. The system of claim 14, wherein a first score is assigned to a first provenance instance from among the one or more provenance instances, the score being indicative of how strongly the first provenance instance influences the at least first feature.

16. The system of claim 15, wherein including the first provenance instance, with a positive influence score, in the training data results in an enhancement to the learning model's performance.

17. The system of claim 14, wherein the analyzing is performed based on at least one of a model-dependent approach or a model-independent approach.

18. A computer program product comprising a non-transitory machine-readable medium storing instructions that, when executed by at least one programmable processor, cause the at least one programmable processor to perform operations comprising:
  analyzing one or more features of the machine learning model, the one or more features being defined based on one or more constraints associated with one or more values and relationships and whether said one or more values and relationships satisfy at least one of the one or more constraints;
  displaying one or more visual indicators based on an analysis of the one or more features and training data used to train the machine learning model, the one or more visual indicators providing a summary of the machine learning model's performance or efficacy; and
  in response to further analyzing the one or more features and the training data, providing at least one or more of: a global explanation about the machine learning model functionality or a local explanation about a given instance, and generating a report summarizing the global and local explanations,
  the global explanation providing general information about one or more functionalities of the machine learning model and a visualization that summarizes the machine learning model's global behavior with respect to the one or more features that are influential in generating one or more identifiable outcomes;
  determining one or more provenance instances based on most positive or most negative influences on at least a first feature associated with the machine learning model's behavior or performance; and
  assigning a first score to a first provenance instance from among the one or more provenance instances, the score being indicative of how positively or negatively the first provenance instance influences the at least first feature,
  the local explanation providing an understanding of how possible changes to the instance's feature values adjust or shift an expected result or projected outcome beyond a first threshold,
  assigning a first score to a first provenance instance from among one or more provenance instances, the first score being indicative of how strongly the first provenance instance influences the at least first feature; and
  assigning a second score to a second provenance instance from among the one or more provenance instances, the second score being indicative of how positively or negatively the first provenance instance influences the at least first feature.

* * * * *